United States Patent
Zhang et al.

(10) Patent No.: US 12,210,956 B2
(45) Date of Patent: Jan. 28, 2025

(54) TRANSLATION METHOD, APPARATUS AND STORAGE MEDIUM

(71) Applicant: Beijing Baidu Netcom Science Technology Co., Ltd., Beijing (CN)

(72) Inventors: Ruiqing Zhang, Beijing (CN); Hui Liu, Beijing (CN); Zhongjun He, Beijing (CN); Zhi Li, Beijing (CN); Hua Wu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/074,853

(22) Filed: Dec. 5, 2022

(65) Prior Publication Data
US 2023/0095352 A1 Mar. 30, 2023

(30) Foreign Application Priority Data
May 16, 2022 (CN) .......................... 202210526893.8

(51) Int. Cl.
*G06N 3/04* (2023.01)
*G06F 40/44* (2020.01)
(Continued)

(52) U.S. Cl.
CPC .......... *G06N 3/0455* (2023.01); *G06F 40/44* (2020.01); *G06F 40/58* (2020.01); *G06N 3/042* (2023.01); *G06N 3/08* (2013.01)

(58) Field of Classification Search
CPC ........ G06N 3/0455; G06N 3/042; G06N 3/08; G06N 3/0442; G06N 3/0464; G06N 3/044;
(Continued)

(56) References Cited

U.S. PATENT DOCUMENTS

2013/0226556 A1 8/2013 Hwang et al.
2021/0312144 A1* 10/2021 Mizushima ............. G06F 40/58
(Continued)

FOREIGN PATENT DOCUMENTS

CA 2469593 A1 12/2004
CN 109446534 A 3/2019
(Continued)

OTHER PUBLICATIONS

Benoît Gaillard et al., Graph representation of synonymy and translation resources for cross-linguistic modelisation of meaning. 24th Pacific Asia Conference on Language, Information and Computation (PACLIC 2010), Institute of Digital Enhancement (Year: 2010).*

(Continued)

*Primary Examiner* — Hai Phan
*Assistant Examiner* — Ian Scott McLean
(74) *Attorney, Agent, or Firm* — Knobbe, Martens, Olson & Bear, LLP

(57) ABSTRACT

The present disclosure provides a translation method and apparatus, an electronic device, and a non-transitory storage medium. An implementation includes: determining an encoded feature of a sentence to be translated by an encoding module; determining, by a graph network module, a knowledge fusion feature of the sentence to be translated based on a preset graph network, wherein the preset graph network is constructed based on a polysemous word in a source language corresponding to the sentence to be translated and a plurality of translated words corresponding to the polysemous word in a target language; determining, by a decoding network, a translated sentence corresponding to the sentence to be translated based on the encoded feature and the knowledge fusion feature.

14 Claims, 8 Drawing Sheets

(51) Int. Cl.
*G06F 40/58* (2020.01)
*G06N 3/042* (2023.01)
*G06N 3/0455* (2023.01)
*G06N 3/08* (2023.01)

(58) Field of Classification Search
CPC ......... G06N 3/045; G06F 40/44; G06F 40/58; G06F 40/237; G06F 40/30
See application file for complete search history.

(56) References Cited

U.S. PATENT DOCUMENTS

| | | | |
|---|---|---|---|
| 2022/0012436 A1* | 1/2022 | Park | G06F 40/58 |
| 2022/0083746 A1* | 3/2022 | Chen | G06N 3/044 |
| 2022/0245358 A1* | 8/2022 | Williams | G06F 40/30 |

FOREIGN PATENT DOCUMENTS

| | | |
|---|---|---|
| CN | 109933602 A | 6/2019 |
| CN | 112395892 A | 2/2021 |
| CN | 112580370 A | 3/2021 |
| CN | 113095087 A | 7/2021 |
| CN | 113139052 A | 7/2021 |
| CN | 113139391 A | 7/2021 |
| CN | 113723116 A | 11/2021 |
| CN | 114186560 A | 3/2022 |

OTHER PUBLICATIONS

Notice of Allowance received in Chinese Application No. 202210526893.8 dated Aug. 10, 2022 in 5 pages.
Office Action received in Chinese Application No. 202210526893.8 dated Jul. 15, 2022 in 10 pages.
Badrinarayanan et al., "A deep convolutional Encoder-Decoder Architecture for Image Segmentation", Machine Intelligence, Lab Department of Engineering, University of Cambridge, UK, Oct. 2016, pp. 1-13.
Zhang et al., "Dynamic network representation learning model based on graph convolutional network and long short-term memory network" Journal of Computer Applications, 2021, vol. 41 (7) pp. 1857-1864.
Qi et al., Learning Human-Object Interactions by Graph Parsing Neural Networks, Graph Parsing Neural Networks (ECCV 2018), Aug. 2018, pp. 1-17.
Research on Mongolian-Chinese Machine Translation based on Generative Method, China Academic Journal Electroic Publishing House, http://www.cnki.net, dated Jun. 9, 2021, 65 pages.

* cited by examiner

TRANSLATION METHOD, APPARATUS AND STORAGE MEDIUM

CROSS-REFERENCE TO RELATED APPLICATIONS

The present application claims the priority of Chinese Patent Application No. 202210526893.8, titled "TRANSLATION METHOD, APPARATUS AND COMPUTER PROGRAM PRODUCT", filed on May 16, 2022, the disclosure of which is incorporated herein by reference in its entirety.

TECHNICAL FIELD

The present disclosure relates to the field of artificial intelligence, particularly to deep learning techniques, and more particularly to a translation method and apparatus, a training method and apparatus, an electronic device, a storage medium, and a computer program product for translation scenarios.

BACKGROUND

When there is a polysemous word which has various meanings, determining a correct translation of the polysemous word is a translation difficulty faced by a neural network translation system. For example, an English word "current" may be translated to a plurality of Chinese words such as "当前" (occurring in or belonging to the present time) and "电流" (a flow of electricity). Since most of the translated words in a corpus have the meaning of "当前" (occurring in or belonging to the present time), it leads to translation errors in many professional fields. However, the "current" cannot be directly translated into "电流" (a flow of electricity) by intervening, which may result in misinterpretation of sentences in many general fields.

SUMMARY

Embodiments of the present disclosure provides a translation method and apparatus, a method and apparatus for training a translation model, an electronic device, a storage medium and a computer program product.

According to a first aspect, some embodiments of the present disclosure provide a translation method, including determining, by an encoding module, an encoded feature of a sentence to be translated; determining, by a graph network module, a knowledge fusion feature of the sentence to be translated based on a preset graph network, wherein the preset graph network is constructed based on a polysemous word in a source language and a plurality of translated words corresponding to the polysemous word, the sentence to be translated corresponds to the source language and the plurality of translated words being in a target language; and determining, by a decoding network, a translated sentence corresponding to the sentence to be translated based on the encoded feature and the knowledge fusion feature.

According to a second aspect, some embodiments of the present disclosure provide a method for training a translation model, including: obtaining a training sample set, wherein a training sample in the training sample set comprises a sentence in a source language and a translated sentence in a target language that correspond to each other; taking the sentence in the source language as an input of an encoding module, taking the sentence in the source language and a preset graph network as inputs of a graph network module, obtaining inputs of a decoding module based on an output of the encoding module and an output of the graph network module, taking the translated sentence in the target language corresponding to an input sentence in the source language as an expected output of the decoding module, and obtaining a translation model comprising a trained encoding module, a trained decoding module and a trained graph network module by using a machine learning method, wherein the preset graph network is constructed based on a polysemous word in the source language corresponding to the sentence in the source language and a plurality of translated words corresponding to the polysemous word, the translated words being in the target language.

According to a third aspect, some embodiments of the present disclosure provide a translation apparatus, including: an encoding unit, configured to determine, by an encoding module, an encoded feature of a sentence to be translated; a graph network unit, configured to determine, by a graph network module, a knowledge fusion feature of the sentence to be translated based on a preset graph network, wherein the preset graph network is constructed based on a polysemous word in a source language and a plurality of translated words corresponding to each of the polysemous word, the sentence to be translated corresponds to the source language and the plurality of translated words being in a target language; a decoding unit, configured to determine, by a decoding network, a translated sentence corresponding to the sentence to be translated based on the encoded feature and the knowledge fusion feature.

According to a fourth aspect, some embodiments of the present disclosure provide an apparatus for training a translation model, including: an acquisition unit, configured to obtain a training sample set, wherein a training sample in the training sample set comprises a sentence in a source language and a translated sentence in a target language that correspond to each other; a training unit, configured to take the sentence in the source language as an input of an encoding module, take the sentence in the source language and a preset graph network as inputs of a graph network module, obtain inputs of a decoding module based on an output of the encoding module and an output of the graph network module, take the translated sentence in the target language corresponding to an input sentence in the source language as an expected output of the decoding module, and obtain a translation model comprising a trained encoding module, a trained decoding module and a trained graph network module by using a machine learning method, wherein the preset graph network is constructed based on a polysemous word in the source language corresponding to the sentence in the source language and a plurality of translated words corresponding to each of the polysemous word, the translated words being in the target language.

According to a sixth aspect, some embodiments of the present disclosure provide a non-transitory computer readable storage medium, storing computer instructions which, when executed by a computer, cause the computer to perform the method described in any of implementations of the first aspect or to perform the method described in any of implementations of the second aspect.

It should be understood that the content described in this section is not intended to identify key or important features of embodiments of the present disclosure, nor is it intended to limit the scope of the present disclosure. Other features of the present disclosure will become readily understood from the following specification.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

In the technical solution of the present disclosure, the collection, storage, use, processing, transmission, provision, disclosure, etc. of the personal information of a user all comply with the provisions of the relevant laws and regulations, and do not violate public order and good customs.

Figure 1:
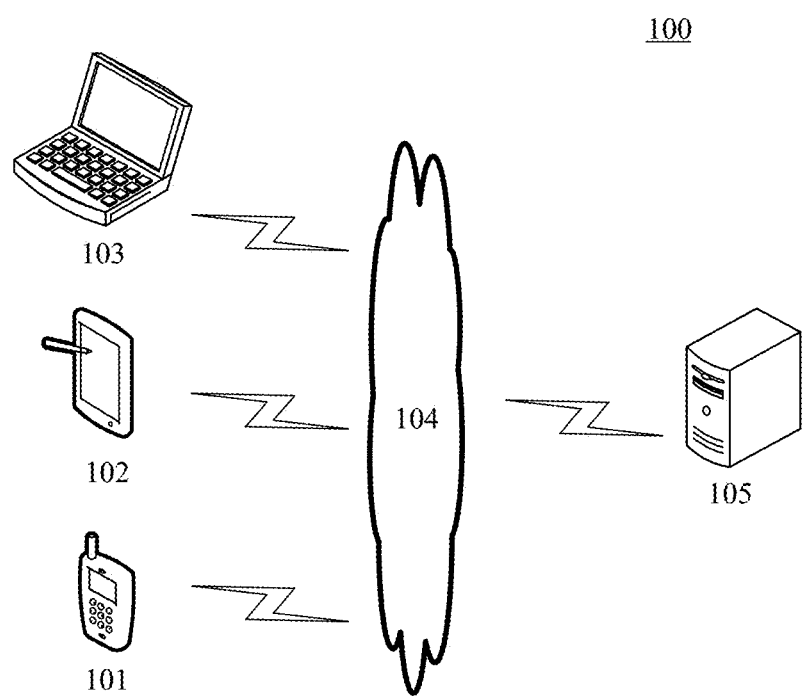
FIG. 1 is an exemplary system architecture to which an embodiment of the present disclosure may be applied.

FIG. 1 illustrates an example architecture 100 in which a translation method and apparatus of the present disclosure, a method and apparatus for training a translation model may be applied.

As shown in FIG. 1, the system architecture 100 may include terminal device(s) 101, 102, 103, a network 104, and a server 105. The communication connection between the terminal device(s) 101, 102, 103 constitutes a topology network, and the network 104 serves as a medium for providing a communication link between the terminal devices 101, 102, 103 and the server 105. Network 104 may include various types of connections, such as wired, wireless communication links, or fiber optic cables, etc.

The terminal devices 101, 102, 103 may be hardware devices or software that support network connections for data interaction and data processing. When the terminal devices 101, 102, 103 are hardware, they may be various electronic devices supporting functions of network connection, information acquisition, interaction, display, processing, and the like, including but not limited to an image acquisition device, a smartphone, a tablet computer, an electronic book reader, a laptop-type portable computer, a desktop computer, and the like. When the terminal devices 101, 102, and 103 are software, they may be installed in the electronic devices listed above. It may be implemented, for example, as a plurality of software or software modules for providing distributed services, or as a single software or software module. It is not specifically limited herein.

The server 105 may be a server providing various services. For example, when the terminal device(s) 101, 102, 103 provide a sentence to be translated, the server 105 may be a background server that uses a graph network to carry knowledge information of a polysemous word in a source language and a target language, and adds, through a graph network module, knowledge fusion features of a target translated word corresponding to the polysemous words to a neural network translation model of a classic encoding module-decoding module, to obtain the translated sentence. The server may also obtain a translation model that implements the above translation task by training. As an example, server 105 could be a cloud server.

It should be noted that the server may be hardware or software. When the server is hardware, it can be implemented as a distributed server cluster of multiple servers or as a single server. When the server is software, it may be implemented as a plurality of software or software modules (e.g., software or software modules used to provide distributed services) or as a single software or software module. It is not specifically limited herein.

It should also be noted that the translation method and the method for training the translation model provided in embodiments of the present disclosure may be executed by the server, may be executed by the terminal device(s), or may be executed by the server and the terminal device(s) in cooperation with each other. Accordingly, the parts (for example, the units) included in the translation apparatus and the apparatus for training the translation model may be all disposed in the server, may be disposed all in the terminal device(s), or some may be disposed in the server while the others may be disposed in the terminal device(s).

It should be understood that the number of terminal devices, networks and servers in FIG. 1 is merely illustrative. There may be any number of terminal devices, networks, and servers as desired for implementation. When the electronic device on which the translation method and the method for training the translation model operates, does not require data transmission with other electronic devices, the system architecture may include only the electronic device on which the translation method, and the method for training the translation model operate, such as a server or a terminal device.

According to the technology of the present disclosure, a translation method is provided, in which a graph network is used to carry knowledge information of a polysemous word in a source language and a target language, and knowledge fusion feature of a target translated word corresponding to the polysemous word is added to a neural network translation model of a classic encoding module-decoding module through a graph network module, so that knowledge fusion in the neural network is realized, a problem in the prior art that an intervention-based machine translation model is difficult to globally understand a sentence to be translated is avoided, and translation accuracy is improved.

Figure 2:
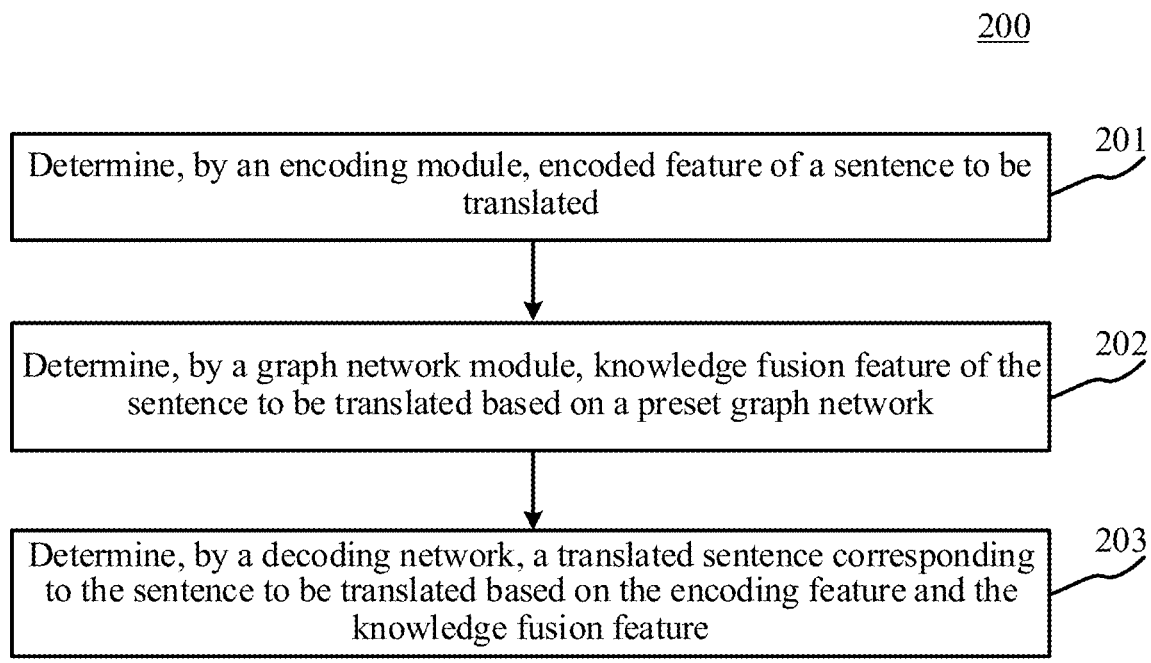
FIG. 2 is a flowchart of a translation method according to an embodiment of the present disclosure.

Referring to FIG. 2, FIG. 2 is a flow chart of a translation method according to an embodiment of the present disclosure, the flow chart 200 includes the following steps.

Step 201, determining, by an encoding module, an encoded feature of a sentence to be translated.

In the present embodiment, the execution body of the translation method (for example, the terminal device or the server in FIG. 1) may obtain the sentence to be translated from a remote location or from a local location based on the wired network connection mode or the wireless network connection mode, and determine the encoded feature of the sentence to be translated by the encoding module.

The sentence to be translated may be in any language, including, but not limited to, English, German, Russian, Chinese or other languages. The sentence to be translated may be carried in text, voice, image, etc. When the sentence to be translated is carried in a voice, it may be converted into a text to be translated by STT (Speech to Text) technique. When the sentence to be translated is carried in an image, it may be recognized as a text to be translated by an OCR (Optical Character Recognition) technique.

In the present embodiment, the above-mentioned execution body may encode a sentence to be translated by using a neural network model having an encoding function to obtain encoded feature corresponding to the sentence to be translated. The neural network model may be, for example, a convolutional neural network model, a recurrent neural network model, or the like.

In a conventional translation model composed of an encoding module and a decoding module, an input of the encoding module is a word sequence (the word sequence corresponds to a sentence to be translated and is in a source language), and an output of the decoding module is another word sequence (this another word sequence corresponds to a translated sentence and is in a target language). However, the neural network model is essentially only a set of parameters, and performs a plurality of operations on an input sequence to obtain an output, so that the translation model maps a word to a number through an encoding style such as ASCII (American Standard Code for Information Interchange). For this purpose, each unique word in each sentence to be translated input into the translation model needs to have a unique index. The input sequence received by the translation model is not actually a word sequence, but an index sequence.

When a plurality of sentence to be translated are input into the translation model successively, the input sequences of the translation model may be represented as a matrix with dimension of "batch size×maximum sentence length", where the batch size may be, for example, the number of the input sentences to be translated. Thus, for a plurality of input sentences to be translated, the indexes of a sentence shorter than the longest sentence may be supplemented through a preset supplementing manner to align the indexes of the shorter sentence with the indexes of the longest sentence, to obtain a final input matrix.

An index does not retain semantic information of a word. For example, a word represented by index 54 and a word represented by index 55 may be completely irrelevant, however, the two indexes are very close together. Therefore, the encoding network in the translation model obtains the input sequence of the sentence to be translated by word embedding.

In the word embedding method, each word in a sentence to be translated is represented by an N-dimensional vector. Similar words have similar word embeddings and are close in distance in an N-dimensional embedding space. Word embedding may be obtained based on models trained based on certain language tasks.

As an example, the encoding network includes an embedding layer and a bidirectional RNN (Recurrent Neural Network) layer. The word embedding process may be performed through an embedding layer, and an input matrix is processed by the embedding layer to obtain an embedding matrix. The bidirectional RNN layer processes the embedding matrix step by step to obtain an encoded feature. Two recurrent layers are used in the bidirectional RNN, with one dropout layer being interposed therebetween. The RNN may be, for example, LSTM (Long Short-Term Memory) and GRU (Gated Recurrent Unit).

Step 202, determining, by a graph network module, a knowledge fusion feature of the sentence to be translated based on a preset graph network.

In this embodiment, the above-mentioned execution body may determine, by a graph network module, the knowledge fusion feature of the sentence to be translated based on the preset graph network. The preset graph network is constructed based on polysemous word(s) in the source language of the sentence to be translated and a plurality of translated words corresponding to each polysemous word, the plurality of translated words being in a language of the translated sentence, that is, in the target language.

The graph network module may be, for example, a feature extraction model capable of extracting association information between nodes in a graph network. As an example, the graph network module may be a GCN (Graph Convolutional Network) model.

The preset graph network is used to carry knowledge information of the polysemous word(s) in the source language and the target language. A polysemous word represents that the word in the source language has a plurality of translated words with different interpretations in the target language.

As an example, a preset graph network may be constructed by the following steps.

For each polysemous word in the source language, determining in the target language a plurality of translated words corresponding to the polysemous word. The polysemous word and the corresponding translated words are used as nodes, and each polysemous word and a plurality of translated words corresponding to each polysemous word are connected to obtain a preset graph network.

In the present embodiment, the preset graph network and the sentence to be translated are used as inputs of the graph network module, and the graph network module determines an association weight between a polysemous word in the sentence to be translated and each translated word corresponding to the polysemous word when there are different sentences to be translated, so as to obtain the knowledge fusion feature.

As an example, connections between nodes in a preset graph network are represented by an adjacent matrix of the graph network module. In the graph network module, correlations between all words in the input sentence to be translated and the translated word(s) corresponding to each word are learned.

$$f(A,H)=A \cdot H \cdot W$$

$A \in R^{N*N}$ is the adjacent matrix of the preset graph network. HE $R^{N*D}$ represents a feature matrix of the input sentence to be translated. $W \in R^{D*D}$ is a parameter learned by the graph network module during training. N represents the number of all words, and D represents feature dimensions.

For a translation task between two different languages, a preset graph network corresponding to the two languages may be correspondingly constructed.

In some alternative implementations of the present embodiment, the execution body may construct the preset graph network by the following steps.

Firstly, the execution body may construct a basic graph network based on the polysemous word(s) in the source language and a plurality of translated words corresponding to the polysemous word(s), the plurality of translated words being in the target language.

Particularly, for each polysemous word in a dictionary in the source language, a plurality of translated words corresponding to the polysemous word and in the target language are determined. Using the polysemous word and the corresponding translated words as nodes, the polysemous word and the plurality of translated words corresponding to the polysemous word are connected to obtain the basic graph network.

Figure 3:
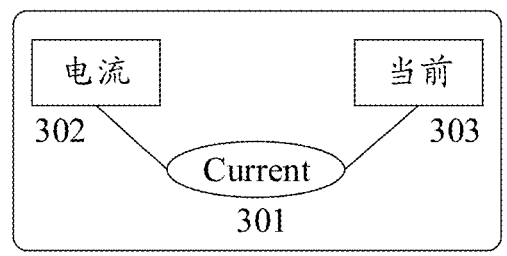
FIG. 3 is a schematic diagram of a basic graph network according to an embodiment of the present disclosure.

As shown in FIG. 3, FIG. 3 illustrates a schematic diagram of a basic graph network. The polysemous word "current" in the source language English corresponds to two translated words in the target language Chinese "电流" (a flow of electricity" and "当前" (occurring in or belonging to the present time) respectively. A node 301 corresponding to "current" is respectively connected to a node 302 corresponding to "电流" (a flow of electricity) and a node 303 corresponding to "当前" (occurring in or belonging to the present time". It should be appreciated that in FIG. 3 the basic graph network is schematically illustrated only by one polysemous word, and an actual basic graph network includes nodes corresponding to a plurality of polysemous words and nodes corresponding to a plurality of translated words.

Secondly, in a preset corpus set, a target corpus pair including both the polysemous word in the basic graph network and a translated word corresponding to the polysemous word is determined.

Each corpus pair in the preset corpus set comprises a sentence in the source language and a sentence in the target language that correspond to each other.

The preset corpus set includes target corpus pairs with rich meanings. As an example, corpus in the preset corpus set is in a general field, so that the obtained preset graph network has strong applicability to each application field. As yet another example, corpus in the preset corpus set is in a specific field, so that the obtained preset graph network has strong pertinence and accuracy for the specific field.

Further taking the polysemous word "current" and the translated word "电流" (a flow of electricity) in FIG. 3 as an example, the target corpus pair may be as follows.

Sentence in the source language is: "The current flows into electric motors".

Sentence in the target language is: "电流流入了电机" (the current flows into electric motors).

Thirdly, the basic graph network is adjusted to obtain the preset graph network based on other words than the polysemous word of the sentence in the source language in the target corpus pair.

As an example, the execution body may add each word in other words other than the polysemous word in the sentence in the source language as a node to the basic graph network, and establish a relationship between the added word and the polysemous word and a relationship between the added word and the translated word corresponding to the polysemous word, to obtain the preset graph network.

Further referring to the above example, in the target corpus pair corresponding to the polysemous word "current" and the translated word "电流" (a flow of electricity), the sentence in the source language is "The current flows into electric motors", and the sentence in the target language is "电流流入了电机" (the current flows into electric motors). The words "the", "flows", "into", "electric" and "motors" may all be added into the basic diagram network as nodes, and connections may be added between the added nodes and the node "current", and connections may be added between the added nodes and the node "电流" (a flow of electricity).

In the present implementation manner, a detailed construction of a preset graph network is provided, in which words in the sentence in the source language corresponding to the target corpus pair including the polysemous word and its translated words are added to the graph network, so that the graph network may represent a relationship between overall information of the sentence to be translated represented by each word of the sentence in the source language and a target translated word of the polysemous word, thereby improving information richness and expressive power of the preset graph network, and improving strength and accuracy of knowledge information in knowledge fusion features obtained by the graph network module based on the preset graph network.

In some alternative implementations of the present embodiment, the above-mentioned execution body may perform the above-mentioned third step by the following step.

First, for each word in the other words, an appearing probability of that the word appears in the target corpus pair when the polysemous word and a translated word corresponding to the polysemous word appear in the target corpus pair at the same time is determined based on the preset corpus set.

In the present embodiment, the appearing probability of the word may be represented by $p(w|w_x, w_y)$. w represents each word of the other words other than the polysemous word in the sentence in the source language, and $w_x$, $w_y$ respectively represents the polysemous word and a translated word corresponding to the polysemous word.

Then, a word whose appearing probability is greater than a preset probability threshold is added to the basic graph network, and a relationship between the added word and the polysemous word and a relationship between the added word and the translated word corresponding to the polysemous word are established to obtain the preset graph network.

In the present embodiment, the preset probability threshold may be provided according to actual conditions, which is not limited herein.

By presetting the probability threshold, words with a small appearing probability may be filtered out, and data amount of the preset graph network may be reduced. For the relationship between the overall information of the sentence to be translated and the translated words, the words with a small appearing probability make a negligible contribution. Therefore, based on filtering by the preset probability threshold, the preset graph network reduces the data amount of the preset graph network while maintaining the information integrity, thereby improving efficiency of obtaining the knowledge fusion features by the graph network module and improving the translation efficiency.

Figure 4:
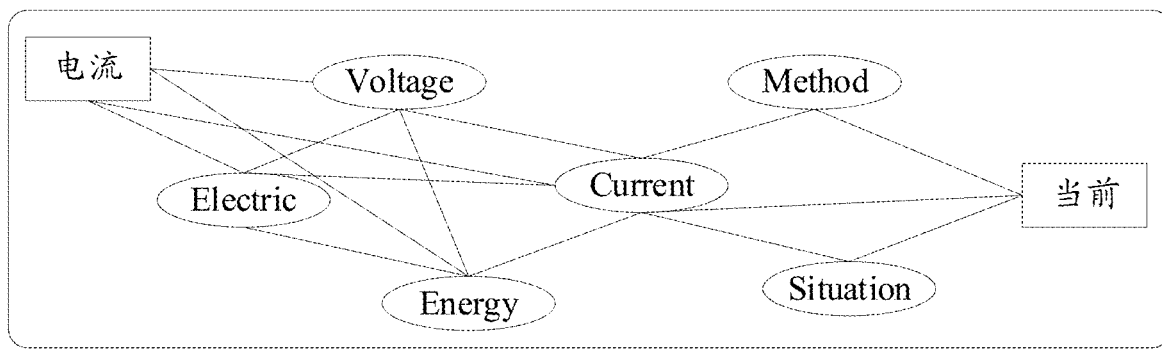
FIG. 4 is a schematic diagram of a preset graph network according to an embodiment of the present disclosure.

Further referring to FIG. 4, FIG. 4 illustrates a schematic diagram of a preset graph network. With continued reference to the above example, in the target corpus pair corresponding to the polysemous word "current" and the translated word "电流" (a flow of electricity), the sentence in the source language is "The current flows into electric motors", where the appearing probability of the word "electric" is greater than the preset probability threshold, so that the preset graph network includes the node corresponding to the word "electric", and other words, such as "voltage", "method", "energy" and "situation", which also meet the preset probability threshold.

In some alternative implementations of the present embodiment, the execution body may perform the above step 202 by: determining, by network layers in the graph network module, correlations between the polysemous word in the sentence to be translated and the plurality of translated words corresponding to the polysemous word based on the preset graph network, and obtaining the knowledge fusion features.

The preset graph network may use a deep learning model to learn the correlations between the polysemous word in the sentence to be translated and the plurality of translated words corresponding to the polysemous word through a plurality of network layers. In the present implementation, the correlations between the polysemous word in the sentence to be translated and the plurality of translated words corresponding to the polysemous word are learned step by step through a plurality of network layers, so that the knowledge fusion feature is obtained, and accuracy of the knowledge fusion feature is improved.

It should be noted that the above description does not limit the order in which the encoding module extracts the encoded features and the graph network module extracts the knowledge fusion features. For example, both operations may be performed simultaneously.

Step 203, determining, by a decoding network, a translated sentence corresponding to the sentence to be translated based on the encoded feature and the knowledge fusion feature.

In the present embodiment, by using relationship between the overall information of the sentence to be translated and a translated word of the polysemous word in the knowledge fusion feature as a guide, the execution body may determine the translated sentence corresponding to the sentence to be translated through the decoding network in the process of decoding according to the encoded feature. The translated sentence may be a sentence of any language different from the source language to which the sentence to be translated belongs.

As an example, the above-mentioned execution body may input the encoded feature and the knowledge fusion feature into the decoding network at the same time to obtain a translated sentence corresponding to the sentence to be translated.

The decoding module may adopt various decoding modules used in a conventional translation model composed of an encoding module and a decoding module.

As an example, the decoder may adopt a RNN network. By using a final output of the decoding network and a final output of the graph network module as input information, the RNN network performs information processing to obtain an index corresponding to each word in the translated sentence, and further to obtain the translated sentence.

As yet another example, the decoding module may adopt an attention model. Then, the decoding module not only takes the final output of the decoding network and the final output of the graph network module as inputs, but also accepts intermediate features of the decoding network and the intermediate features of the graph network module. The intermediate features are, for example, features obtained at each intermediate network layer in the encoding network, features obtained at each intermediate network layer in the graph network module. The decoding network may give different weights to the intermediate features and the final output features of the encoding network to determine the translated sentence based on attention mechanism.

In some alternative implementations of the present embodiment, the above-described execution body may perform the above-described step 203 by the following steps.

Firstly, encoded feature and knowledge fusion feature are fused to obtain fused feature. Then, by the decoding network, the translated sentence corresponding to the sentence to be translated is determined based on the fused feature.

As an example, the above-described execution body may superimpose the knowledge fusion feature on the encoded feature to obtain the fused feature.

Further continuing to take the polysemous word "current" as an example, the output of the network module is a matrix $R^{N*D}$ (where N represents the number of polysemous words in the dictionary and D represents the feature dimension). The vector (i.e., the knowledge fusion feature) of the target translated word corresponding to the polysemous word is took from the output of N*D. And then the vector of the target translated word is superimposed on the feature of the word "current" and the final translated sentence according to the superimposed feature is generated by the decoding module.

In the present implementation, based on decoding the fused feature obtained by fusing the encoded feature and the knowledge fusion feature, accuracy of the translated sentence obtained by decoding is improved.

Figure 5:
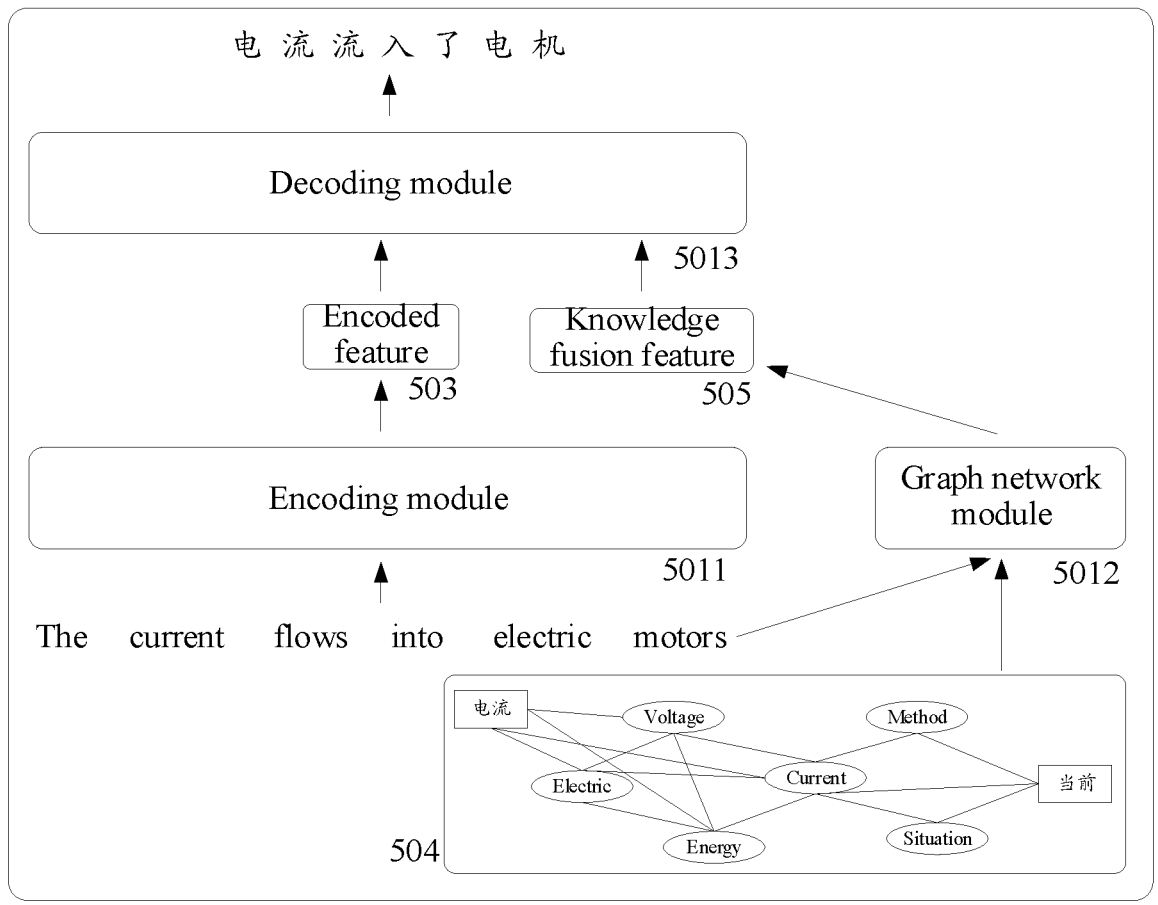
FIG. 5 is a schematic diagram of an application scenario of a translation method according to the present embodiment.

Further referring to FIG. 5, FIG. 5 is a schematic diagram 500 of an application scenario of a translation method according to the present embodiment. In the application scenario of FIG. 5, the server 501 obtains the sentence to be translated "The current flows into electric motors" according to translation request of terminal device 502. The server first determines an encoded feature 503 of the sentence to be translated through the encoding module 5011 in the translation model; determines the knowledge fusion feature 505 of the sentence to be translated by the graph network module 5012 based on the preset graph network 504. The preset graph network 504 is constructed based on polysemous word(s) in a source language corresponding to the sentence to be translated and a plurality of translated words corresponding to the polysemous word(s), the plurality of translated words being in a target language. Finally, based on the encoded feature 503 and the knowledge fusion feature 505, the translated sentence "电流流入了电机" (the current flows into electric motors) corresponding to the sentence to be translated is determined by the decoding network 5013.

In the present embodiment, a translation method is provided, in which a graph network is used to carry knowledge information of a polysemous word in a source language and a target language, and knowledge fusion feature of a target translated word corresponding to the polysemous word is added to a neural network translation model of a classic encoding module-decoding module through a graph network module, so that knowledge fusion in the neural network is realized, a problem in the prior art that an intervention-based machine translation model is difficult to globally understand a sentence to be translated is avoided, and translation accuracy is improved.

Figure 6:
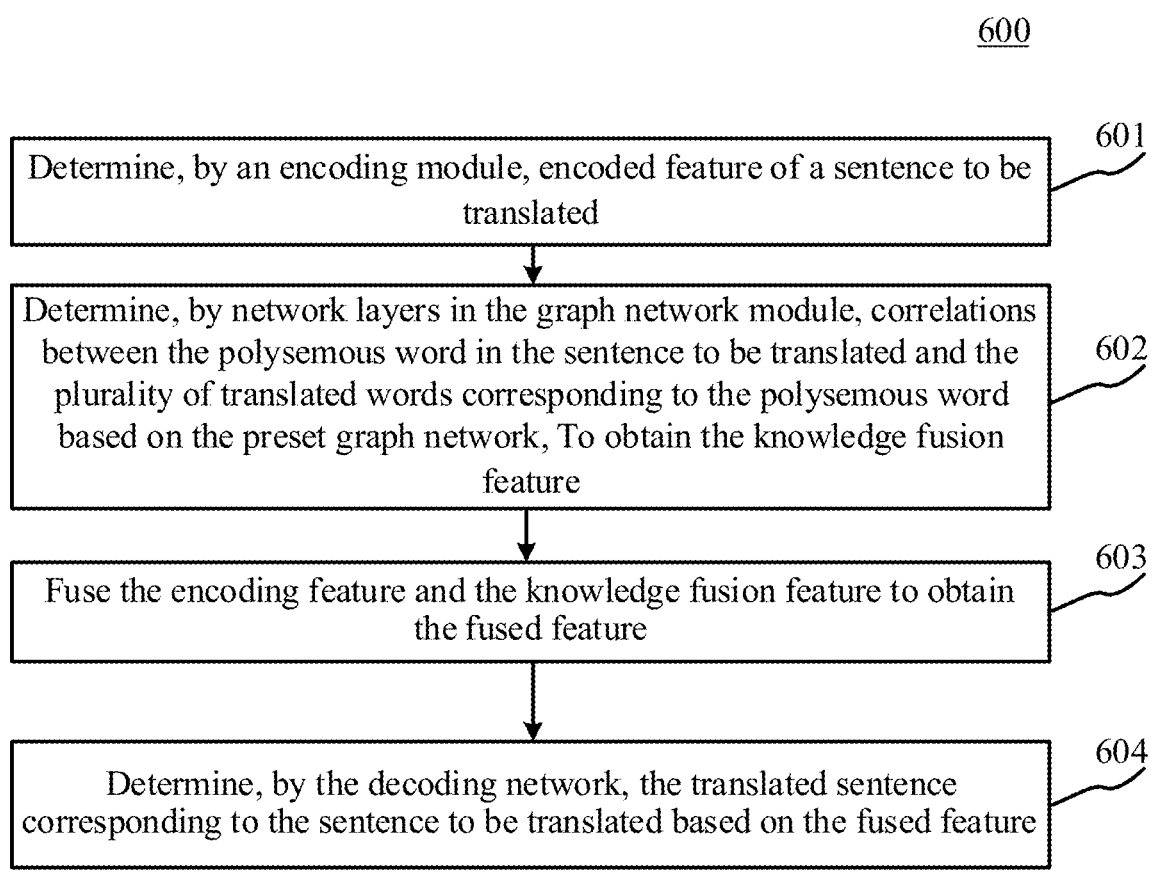
FIG. 6 is a flowchart of a translation method according to yet another embodiment of the present disclosure.

Further referring to FIG. 6, FIG. 6 illustrates a schematic flow 600 of yet a translation method according to another embodiment of the present disclosure, including the following steps.

Step 601, determining encoded feature of a sentence to be translated by an encoding module.

Step 602, determining, by network layers in the graph network module, correlations between the polysemous word of the sentence to be translated and the plurality of translated words corresponding to the polysemous word based on the preset graph network, and obtaining the knowledge fusion feature.

The preset graph network is constructed based on polysemous word(s) in the source language of the sentence to be translated and a plurality of translated words corresponding to the polysemous word(s), the plurality of translated words being in a target language.

Step 603, fusing the encoded feature and the knowledge fusion feature to obtain the fused feature.

Step 604, determining, by the decoding network, the translated sentence corresponding to the sentence to be translated based on the fused feature.

As can be seen from the present embodiment, compared with the corresponding embodiment of FIG. 2, the process 600 of the translation method in the present embodiment illustrates the determination process of the knowledge fusion feature and the decoding process based on the fused feature, thereby further improving the translation accuracy.

Figure 7:
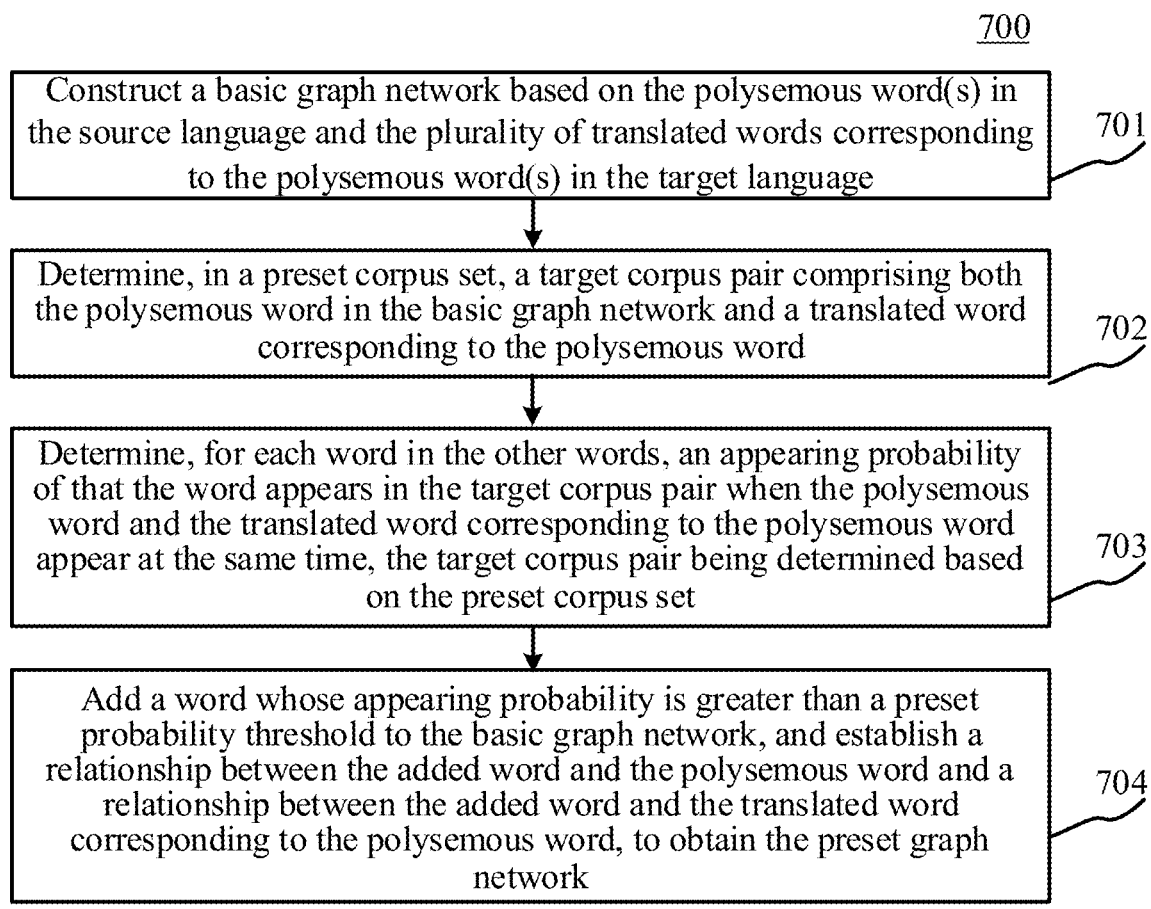
FIG. 7 is a flowchart of a method for constructing a preset graph network according to an embodiment of the present disclosure.

Further referring to FIG. 7, FIG. 7 illustrates a schematic flow 700 of a construction process of a preset graph network in the translation method according to an embodiment of the present disclosure, including the following steps.

Step 701, constructing a basic graph network based on the polysemous word(s) in the source language and the plurality of translated words corresponding to the polysemous word (s), the plurality of translated words being in the target language.

Step 702, determining, in a preset corpus set, a target corpus pair comprising both the polysemous word in the basic graph network and a translated word corresponding to the polysemous word.

Each corpus pair in the preset corpus set comprises a sentence in the source language and a sentence in the target language that correspond to each other.

Step 703, determining, for each word of the other words, an appearing probability of that the word appears in the target corpus pair when the polysemous word and the translated word corresponding to the polysemous word appear at the same time, the target corpus pair being determined based on the preset corpus set.

Step 704, adding a word whose appearing probability is greater than a preset probability threshold to the basic graph network, and establishing a relationship between the added word and the polysemous word and a relationship between the added word and the translated word corresponding to the polysemous word, to obtain the preset graph network.

In the present embodiment, the construction process of the preset graph network, in which the amount of data of the graph network is reduced, and the relationship between the overall information of the sentence to be translated and a translated word is retained, is described, so that the efficiency of obtaining the knowledge fusion feature by the graph network module based on the preset graph network is improved, and the translation efficiency is improved.

Figure 8:
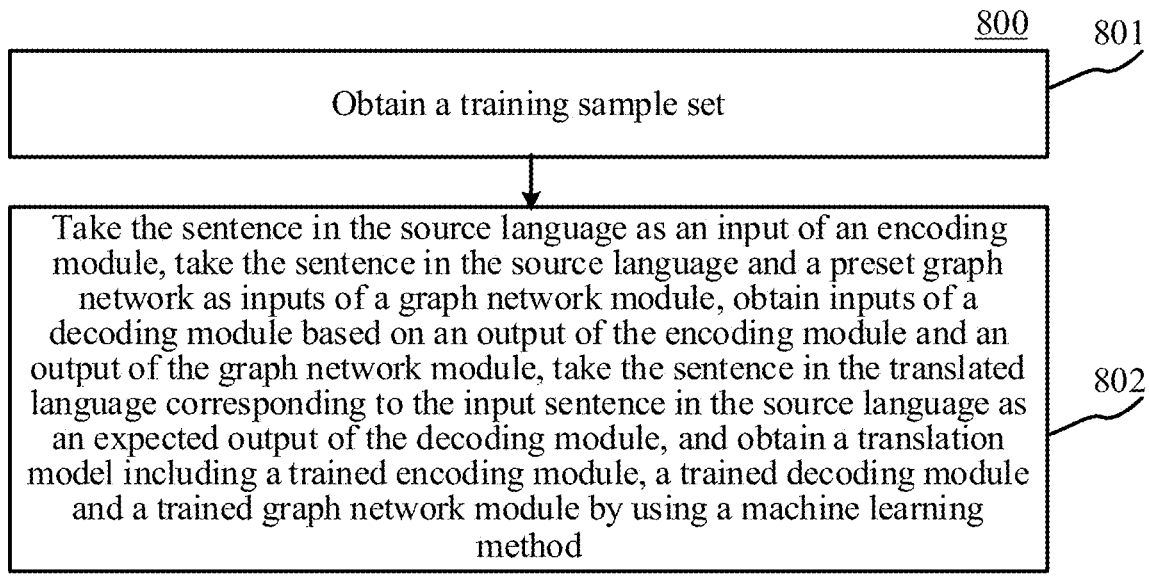
FIG. 8 is a flowchart of a method for training a translation model according to an embodiment of the present disclosure.

Further referring to FIG. 8, FIG. 8 illustrates a schematic flow 800 of a method for training a translation model according to an embodiment of the present disclosure, including the following steps.

Step 801, obtaining a training sample set.

In this embodiment, the execution body of the method for training the translation model (for example, the terminal device or the server in FIG. 1) may obtain the training sample set remotely or locally based on the wired network connection mode or the wireless network connection mode. A training sample in the training sample set comprises a sentence in the source language and a sentence in the target language that correspond to each other. The sentence to be translated may be in any language, including, but not limited to, English, German, Russian, Chinese, or other languages. The sentence in the target language may be a sentence in any language different from the source language.

Step 802, taking the sentence in the source language as an input of an encoding module, taking the sentence in the source language and a preset graph network as inputs of a graph network module, obtaining inputs of a decoding module based on an output of the encoding module and an output of the graph network module, taking the sentence in the target language corresponding to the input sentence in the source language as an expected output of the decoding module, and obtaining a translation model including a trained encoding module, a trained decoding module and a trained graph network module by using a machine learning method.

The preset graph network is constructed based on polysemous word(s) in the source language corresponding to the sentence to be translated and a plurality of translated words corresponding to the polysemous word(s), the plurality of translated words being in the target language.

In the embodiment, a combination relationship between the encoding module, the graph network module, and the decoding module in the translation model is as follows: the output of the encoding module and the output of the graph network module are connected to the input of the decoding module. In the training process, the sentence in the source language is used as an input of the encoding module, and a preset graph network and the sentence in the source language are used as inputs of the graph network module, to obtain an output of the encoding module and an output of the graph network module. Further, the output of the encoding module and the output of the graph network module are used as inputs of the decoding module to obtain the actual output of the decoding module, that is, the actual output of the translation model. Then, a preset loss function is used to determine a loss between the actual output of the decoding module and the expected output (the sentence in the target language corresponding to the input sentence in source language), and then the encoding module, the graph network module, and the decoding module are updated according to the loss.

The training operation is performed circularly, to obtain a trained translation model in response to reaching a preset end condition. The preset end condition may be, for example, that the training time length reaches a preset time length threshold, that the number of training exceeds a preset number threshold, or that the training loss has converged.

In the present embodiment, a method for training a translation model is provided. In the training process, a preset graph network is used to carry knowledge information of a polysemous word in a source language and a target language, knowledge in the preset graph network is learned through graph network module, and a target translated word corresponding to the polysemous word is added to a neural network translation model of a classic encoding module-decoding module, so that knowledge fusion in the neural network is realized, a problem in the prior art that an intervention-based machine translation model is difficult to globally understand a sentence to be translated is avoided, and translation accuracy is improved.

In some alternative implementations of the present embodiment, the above-described execution body may perform the above-described step 802 by the following steps.

Firstly, with the sentence in the source language and the preset graph network as the inputs of the graph network module, with a target translated word in the translated sentence in the target language corresponding to the input sentence in the source language as an expected output of the graph network module, the trained graph network module is obtained according to a first loss function by using the machine learning method.

The target translated word is a translated word in the target language corresponding to the polysemous word in the sentence in the source language.

As an example, a sentence in the source language and a preset graph network are used as inputs of the graph network module to obtain an actual output of the graph network module. Further, according to the first loss function, the loss between the actual output of the graph network module and the expected output (the target translated word in the translated sentence in the target language corresponding to the input sentence in the source language) is determined, and the graph network module is updated based on the loss through a gradient descent method, a random gradient descent method, or the like. The training operation of the above-mentioned graph network module is performed circularly, and the trained graph network module is obtained in response to reaching a preset end condition. The first loss function is, for example, a cross entropy loss function, a square loss function.

As an example, connections between nodes in a preset graph network is represented by an adjacent matrix of the graph network module. The network layers in the graph network module learn the correlations between all words in the input sentence to be translated and a translated word corresponding to each of the words.

$$f(A,H)=A \cdot H \cdot W$$

A E $R^{N*N}$ is the adjacent matrix of the preset graph network. HE $R^{N*D}$ represents a feature matrix of the input sentence to be translated. W∈$R^{D*D}$ is a parameter learned by the graph network module during training. N represents the number of all words, and D represents feature dimensions.

Then, with the sentence in the source language as the input of the encoding module, the input of the decoding module is obtained based on the output of the encoding module and the output of the graph network module, with the sentence in the target language corresponding to the input sentence in the source language as the expected output of the decoding module, the trained encoding module and the trained decoding module are obtained according to a second loss function by using the machine learning method.

As an example, with the sentence in the source language as the input of the encoding module, an input of the decoding module is obtained based on an output of the encoding module and an output of the graph network module, thereby obtaining an actual output of the decoding module. According to the second loss function, the loss between the actual output of the decoding module and the expected output (the sentence in the target language corresponding to the input sentence in the source language) is determined. Based on the loss, the encoding module and the decoding module are updated through a gradient descent method, a random gradient descent method, or the like. The training operation of the encoding module and the decoding module is performed circularly, to obtain the trained encoding module and the trained decoding module in response to reaching a preset end condition. The second loss function may be the same as the first loss function or may be different from the first loss function.

It should be noted that the training operations of the graph network correspond to the training operations of the encoding module and the decoding module. Particularly, one training operation cycle of the graph network module and one training operation cycle of the encoding module and the decoding module may be completed based on the same one sentence in the source language.

Finally, a translation model is obtained based on the trained encoding module, the trained decoding module and the trained graph network module.

In the present implementation, the graph network module, the encoding module and the decoding module are trained independently, and the network modules are trained by different losses, so that the training efficiency and the accuracy of the translation model are improved.

In some alternative implementations of the present embodiment, the execution body may construct the preset graph network by the following steps.

Firstly, a basic graph network is constructed based on the polysemous word(s) in the source language and the plurality of translated words corresponding to the polysemous word (s), the plurality of translated words being in the target language.

Secondly, in the preset corpus set, a target corpus pair including both the polysemous word in the basic graph network and a translated word corresponding to the polysemous word is determined.

Each corpus pair in the preset corpus set comprises a sentence in the source language and a sentence in the target language that correspond to each other.

Thirdly, the basic graph network is adjusted based on other words other than the polysemous word in the sentence in the source language in the target corpus pair, to obtain the preset graph network.

In the present implementation manner, a detailed construction of a preset graph network is provided, in which words of sentence in the source language in the target corpus pair, which corresponds to the polysemous word and the translated word, are added to the graph network, so that the graph network may represent a relationship between overall information of the sentence to be translated represented by words of the sentence in the source language and the target translated word of the polysemous word, thereby improving information richness and expressive power of the preset graph network, and improving strength and accuracy of knowledge information in knowledge fusion features obtained by the graph network module based on the preset graph network.

In some alternative implementations of the present embodiment, the above-mentioned execution body may perform the above-mentioned third step by the following steps.

First, for each word in the other words, an appearing probability of that the word appears in the target corpus pair when the polysemous word and a translated word corresponding to the polysemous word appear at the same time is determined based on the preset corpus set. Then, a word whose appearing probability is greater than a preset probability threshold is added to the basic graph network, and a relationship between the added word and the polysemous word and a relationship between the added word and the translated word corresponding to the polysemous word are established to obtain the preset graph network.

By presetting the probability threshold, words with a small appearing probability may be filtered out, and data amount of the preset graph network may be reduced. For the relationship between the overall information of the sentence to be translated and a translated word, the words with a small appearing probability make a negligible contribution. Therefore, by filtering according to the preset probability threshold, the preset graph network reduces the data amount of the preset graph network while maintaining information integrity, thereby improving efficiency of obtaining the knowledge fusion features by the graph network module and improving the translation efficiency.

Figure 9:
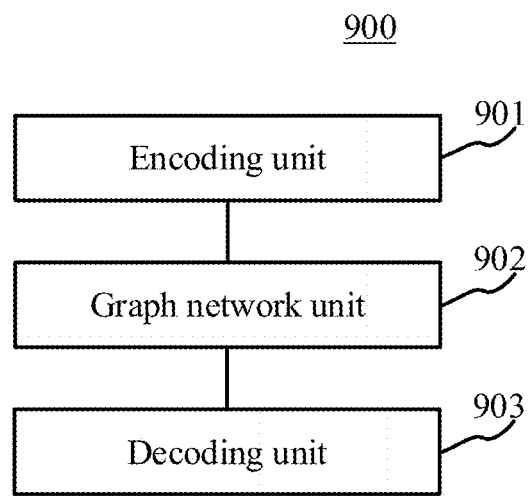
FIG. 9 is a block diagram of a translation apparatus according to an embodiment of the present disclosure.

Further referring to FIG. 9, as an implementation of the method shown in each of the above figures, an embodiment of the present disclosure provides a translation apparatus which corresponds to the method embodiment shown in FIG. 2 and which is particularly applicable to various electronic devices.

As shown in FIG. 9, the translation apparatus includes an encoding unit 901, a graph network unit 902 and a decoding unit 903. The encoding unit 901 is configured to determine, by an encoding module, an encoded feature of a sentence to be translated. A graph network unit 902 is configured to determine, by a graph network module, a knowledge fusion feature of the sentence to be translated based on a preset graph network, wherein the preset graph network is constructed based on a polysemous word in a source language and a plurality of translated words corresponding to the polysemous word, the sentence to be translated corresponds to the source language and the plurality of translated words being in a target language. The decoding unit 903 is configured to determine, by a decoding network, a translated sentence corresponding to the sentence to be translated based on the encoded feature and the knowledge fusion feature.

In some alternative implementations of the present embodiment, the decoding unit 903 is further configured to fuse the encoded feature and the knowledge fusion feature to obtain a fused feature; and determine, by the decoding network, the translated sentence corresponding to the sentence to be translated based on the fused feature.

In some alternative implementations of the present embodiment, the graph network unit 902 is further configured to determine, by network layers in the graph network module, correlations between the polysemous word in the sentence to be translated and a plurality of translated words corresponding to the polysemous word in the sentence to be translated based on the preset graph network, and obtaining the knowledge fusion feature.

In some alternative implementations of the present embodiment, the apparatus further includes a graph network constructing unit (not shown) configured to: construct a basic graph network based on the polysemous word in the source language and the plurality of translated words corresponding to the polysemous word, the plurality of translated words being in the target language; determine, in a preset corpus set, a target corpus pair comprising both the polysemous word in the basic graph network and a translated word corresponding to the polysemous word, wherein each corpus pair in the preset corpus set comprises a sentence in the source language and a sentence in the target language that correspond to each other; and adjust the basic graph network to obtain the preset graph network based on other words other than the polysemous word in the sentence in the source language in the target corpus pair.

The graph network constructing unit (not shown) is further configured to determine, for each word in the other words, an appearing probability of that the each word appears in the target corpus pair when the polysemous word and the translated word corresponding to the polysemous word appear in the target corpus pair at the same time based on the preset corpus set; and add a word whose appearing probability is greater than a preset probability threshold to the basic graph network, and establishing a relationship between the added word and the polysemous word and a relationship between the added word and the translated word corresponding to the polysemous word, to obtain the preset graph network.

In the present embodiment, a translation apparatus is provided, in which a graph network is used to carry knowledge information of polysemous word(s) in a source language and a target language, and knowledge fusion feature of a target translated word corresponding to the polysemous word is added to a neural network translation model of a classic encoding module-decoding module through a graph network module, so that knowledge fusion in the neural network is realized, a problem in the prior art that an intervention-based machine translation model is difficult to globally understand a sentence to be translated is avoided, and translation accuracy is improved.

Figure 10:
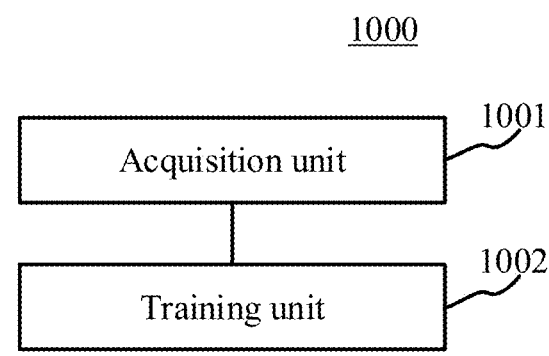
FIG. 10 is a block diagram of an apparatus for training a translation model according to an embodiment of the present disclosure.

Further referring to FIG. 10, as an implementation of the method shown in each of the above figures, an embodiment of the present disclosure provides an apparatus for training a translation model, which corresponds to the method embodiment shown in FIG. 8, and which is particularly applicable to various electronic devices.

As shown in FIG. 10, the apparatus for training a translation model includes an acquisition unit 1001 configured to obtain a training sample set, wherein a training sample in the training sample set comprises a sentence in a source language and a translated sentence in a target language that correspond to each other; the training unit 1002 configured to take the sentence in the source language as an input of an encoding module, taking the sentence in the source language and a preset graph network as inputs of a graph network module, obtain inputs of a decoding module based on an output of the encoding module and an output of the graph network module, take the translated sentence in the target language corresponding to an input sentence in the source language as an expected output of the decoding module, and obtain a translation model comprising a trained encoding module, a trained decoding module and a trained graph network module by using a machine learning method, wherein the preset graph network is constructed based on a polysemous word in the source language corresponding to the sentence in the source language and a plurality of translated words corresponding to the polysemous word, the translated words being in the target language.

In some alternative implementations of the present embodiment, the training unit 1002 is further configured to take the sentence in the source language and the preset graph network as the inputs of the graph network module, take a target translated word in the translated sentence in the target language corresponding to the input sentence in the source language as an expected output of the graph network module, and obtain the trained graph network module according to a first loss function by using the machine learning method, wherein the target translated word is a translated word in the target language corresponding to the polysemous word in the sentence in the source language; take the sentence in the source language as the input of the encoding module, obtain the inputs of the decoding module based on the output of the encoding module and the output of the graph network module, take the translated sentence in the target language corresponding to the input sentence in the source language as the expected output of the decoding module, and obtain the trained encoding module and the trained decoding module according to a second loss function by using the machine learning method; and obtain the translation model based on the trained encoding module, the trained decoding module and the trained graph network module.

In some alternative implementations of the present embodiment, the apparatus further includes a graph network constructing unit (not shown) configured to construct a basic graph network based on the polysemous word in the source language and the plurality of translated words corresponding to each of the polysemous word, the plurality of translated words being in the target language; determine, in a preset corpus set, a target corpus pair comprising both the polysemous word in the basic graph network and a translated word corresponding to the polysemous word, wherein each corpus pair in the preset corpus set comprises a sentence in the source language and a sentence in the target language that correspond to each other; and adjust the basic graph network to obtain the preset graph network based on other words other than the polysemous word in the sentence in the source language in the target corpus pair.

In some alternative implementations of the present embodiment, the graph network constructing unit is further configured to: determine, for each word in the other words, an appearing probability of that the each word appears in the target corpus pair when the polysemous word and the translated word corresponding to the polysemous word appear in the target corpus pair at the same time based on the preset corpus set; and add a word whose appearing probability is greater than a preset probability threshold to the basic graph network, and establishing a relationship between the added word and the polysemous word and a relationship between the added word and the translated word corresponding to the polysemous word, to obtain the preset graph network.

In the present embodiment, an apparatus for training a translation model is provided. In the training process, a preset graph network is used to carry knowledge information of polysemous word(s) in a source language and a target language, knowledge in the preset graph network is learned through graph network module, and a target translated word corresponding to the polysemous word is added to a neural network translation model of a classic encoding module-decoding module, so that knowledge fusion in the neural network is realized, a problem in the prior art that an intervention-based machine translation model is difficult to globally understand a sentence to be translated is avoided, and translation accuracy is improved.

According to an embodiment of the present disclosure, an electronic device is provided. The electronic device includes one or more processors; and a storage device in communication with one or more processor, where the storage device stores instructions which, when executed by the one or more processor, enable the one or more processor to perform the translation method and the method for training the translation model described in any of the above embodiments.

According to an embodiment of the present disclosure, a readable storage medium is provided. The readable storage medium stores a computer instruction which, when executed by a computer, causes the computer to perform the translation method and the method for training a translation model described in any of the above embodiments.

Figure 11:
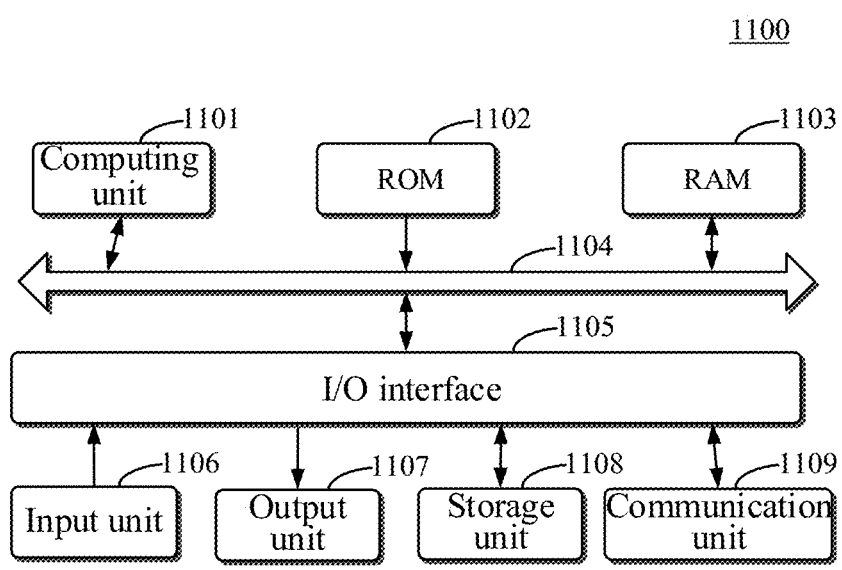
FIG. 11 is a schematic structural diagram of a computer system suitable for implementing embodiments of the present disclosure.

FIG. 11 is a schematic block diagram of an example electronic device 1100 that may be adapted to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital assistant, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 11, the device 1100 includes a computing unit 1101, which can perform various appropriate actions and processes according to a computer program stored in a read only memory (ROM) 1102 or a computer program loaded from the storage unit 1108 into a random access memory (RAM) 1103. In RAM 1103, various programs and data required for the operation of device 1100 can also be stored. The computing unit 1101, ROM 1102, and RAM 1103 are connected to each other through a bus 1104. Input/output (I/O) interface 1105 is also connected to bus 1104.

A plurality of components in the device 1100 are connected to the I/O interface 1105, including: an input unit 1106, such as a keyboard, a mouse, etc.; an output unit 1107, such as various types of displays, speakers, and the like; a storage unit 1108, such as a magnetic disk, an optical disk, and the like; and a communication unit 1109, such as a network card, a modem, a wireless communication transceiver, and the like. The communication unit 1109 allows the device 1100 to exchange information/data with other devices through computer networks such as the Internet and/or various telecommunication networks.

The computing unit 1101 may be various general-purpose and/or special-purpose processing components with processing and computing capabilities. Some examples of the computing unit 1101 include, but are not limited to, a central processing unit (CPU), a graphics processing unit (GPU), various dedicated artificial intelligence (AI) computing chips, various computing units that run machine learning model algorithms, digital signal processors (DSPS), and any appropriate processors, controllers, microcontrollers, and the like. The calculation unit 1101 performs the various methods and processes described above, such as a translation method. For example, in some embodiments, the translation may be implemented as a computer software program that is tangibly contained in a machine-readable medium, such as a storage unit 1108. In some embodiments, part or all of the computer program may be loaded and/or installed on the device 1100 via ROM 1102 and/or communication unit 1109. When the computer program is loaded into RAM 1103 and executed by the computing unit 1101, one or more steps of the translation method described above may be performed. Alternatively, in other embodiments, the computing unit 1101 may be configured to perform the translation method by any other suitable means (e.g., by means of firmware).

Various embodiments of the systems and technologies described above in this paper can be implemented in digital electronic circuit systems, integrated circuit systems, field programmable gate arrays (FPGAs), application specific integrated circuits (ASIC), application specific standard products (ASSP), system on chip (SOC), load programmable logic devices (CPLD), computer hardware, firmware, software, and/or combinations thereof. These various embodiments may include: being implemented in one or more computer programs, the one or more computer programs can be executed and/or interpreted on a programmable system including at least one programmable processor, which can be a special-purpose or general-purpose programmable processor, and can receive data and instructions from the storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of general-purpose computer, special-purpose computer or other programmable data processing device, so that when the program code is executed by the processor or controller, the functions/operations specified in the flow chart and/or block diagram are implemented. The program code can be completely executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium can be a machine-readable signal medium or a machine-readable storage medium. Machine readable media may include, but are not limited to, electronic, magnetic, optical, electromagnetic, infrared, or semiconductor systems, apparatuses, or devices, or any suitable combination of the foregoing. More specific examples of machine-readable storage media may include one or more wire based electrical connections, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with users, the systems and techniques described herein can be implemented on a computer with: a display device for displaying information to users (for example, a CRT (cathode ray tube) or LCD (liquid crystal display) monitor); and a keyboard and a pointing device (e.g., a mouse or a trackball) through which the user can provide input to the computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including background components (e.g., as a data server), or a computing system including middleware components (e.g., an application server) or a computing system including a front-end component (e.g., a user computer with a graphical user interface or a web browser through which a user can interact with embodiments of the systems and techniques described herein), or a computing system including any combination of the back-end component, the middleware component, the front-end component. The components of the system can be interconnected by digital data communication (e.g., communication network) in any form or medium. Examples of communication networks include local area networks (LANs), wide area networks (WANs), and the Internet.

A computer system may include a client and a server. The client and the server are generally far away from each other and usually interact through communication networks. The relationship between the client and the server is generated by computer programs running on the corresponding computers and having a client server relationship with each other. The server can be a cloud server, also known as cloud computing server or cloud host, is a host product in the cloud computing service system, to solve the defects of the management difficulty and weak service scalability of difficult management and weak expansibility when the traditional physical host and Virtual Private Server (VPS) are in services, or the server can be a distributed system server, or a blockchain server.

According to the technology of the present disclosure, a translation method is provided, in which a graph network is used to carry knowledge information of a polysemous word in a source language and a target language, and knowledge fusion feature of a target translated word corresponding to the polysemous word is added to a neural network translation model of a classic encoding module-decoding module through a graph network module, so that knowledge fusion in the neural network is realized, a problem in the prior art that an intervention-based machine translation model is difficult to globally understand a sentence to be translated is avoided, and translation accuracy is improved.

It should be understood that various forms of processes shown above can be used to reorder, add or delete steps. For example, the steps recorded in the present disclosure can be performed in parallel, in sequence, or in different orders, as long as the desired results of the technical solution of the present disclosure can be achieved, which is not limited herein.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure. Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

What is claimed is:

1. A translation method, comprising:
   determining, by an encoding module, an encoded feature of a sentence to be translated;
   determining, by a graph network module, a knowledge fusion feature of the sentence to be translated based on a preset graph network, wherein the preset graph network is constructed based on a polysemous word in a source language and a plurality of translated words in a target language corresponding to the polysemous word, wherein the sentence to be translated is in the source language and the plurality of translated words are in the target language, and wherein the target language and the source language are different languages; and determining, by a decoding network, a translated sentence corresponding to the sentence to be translated based on the encoded feature and the knowledge fusion feature, wherein before determining, by the graph network module, the knowledge fusion feature of the sentence to be translated based on the preset graph network, the method further comprises:

constructing a basic graph network based on the polysemous word in the source language and the plurality of translated words in the target language corresponding to the polysemous word;

determining, in a preset corpus set, a target corpus pair comprising both the polysemous word in the basic graph network and a translated word in the target language corresponding to the polysemous word, wherein each corpus pair in the preset corpus set comprises a sentence in the source language and a sentence in the target language that correspond to each other; and adjusting the basic graph network to obtain the preset graph network based on another word other than the polysemous word in the sentence in the source language in the target corpus pair, wherein the preset graph network includes a node for the polysemous word in the source language, a node for the translated word in the target language comprised in the target corpus pair, a node for the another word in the source language, and correlations between any two of the nodes.

2. The method according to claim 1, wherein determining, by the decoding network, the translated sentence corresponding to the sentence to be translated based on the encoded feature and the knowledge fusion feature comprises:

fusing the encoded feature and the knowledge fusion feature to obtain a fused feature; and determining, by the decoding network, the translated sentence corresponding to the sentence to be translated based on the fused feature.

3. The method according to claim 1, wherein determining, by the graph network module, the knowledge fusion feature of the sentence to be translated based on the preset graph network comprises:

determining, by network layers in the graph network module, correlations between the polysemous word in the sentence to be translated and a plurality of translated words corresponding to the polysemous word in the sentence to be translated based on the preset graph network, and obtaining the knowledge fusion feature.

4. The method according to claim 1, wherein adjusting the basic graph network to obtain the preset graph network based on another word other than the polysemous word in the sentence in the source language in the target corpus pair comprises:

determining, for each word in other words other than the polysemous word in the sentence in the source language in the target corpus pair, an appearing probability that each word appears in the target corpus pair when the polysemous word and the translated word corresponding to the polysemous word appear in the target corpus pair at the same time based on the preset corpus set; and adding a word whose appearing probability is greater than a preset probability threshold to the basic graph network, and establishing a relationship between the added word and the polysemous word and a relationship between the added word and the translated word corresponding to the polysemous word, to obtain the preset graph network.

5. A method for training a translation model, comprising:

obtaining a training sample set, wherein a training sample in the training sample set comprises a sentence in a source language and a translated sentence in a target language that correspond to each other; and taking the sentence in the source language as an input of an encoding module, taking the sentence in the source language and a preset graph network as inputs of a graph network module, obtaining inputs of a decoding module based on an output of the encoding module and an output of the graph network module, taking the translated sentence in the target language corresponding to an input sentence in the source language as an expected output of the decoding module, and obtaining a translation model comprising a trained encoding module, a trained decoding module, and a trained graph network module by using a machine learning method, wherein the preset graph network is constructed based on a polysemous word in the source language corresponding to the sentence in the source language and a plurality of translated words in the target language corresponding to the polysemous word, wherein the target language and the source language are different languages, and wherein the preset graph network is constructed by:

constructing a basic graph network based on the polysemous word in the source language and the plurality of translated words in the target language corresponding to the polysemous word;

determining, in a preset corpus set, a target corpus pair comprising both the polysemous word in the basic graph network and a translated word in the target language corresponding to the polysemous word, wherein each corpus pair in the preset corpus set comprises a sentence in the source language and a sentence in the target language that correspond to each other; and adjusting the basic graph network to obtain the preset graph network based on another word other than the polysemous word in the sentence in the source language in the target corpus pair, wherein the preset graph network includes a node for the polysemous word in the source language, a node for the translated word in the target language comprised in the target corpus pair, a node for the another word in the source language, and correlations between any two of the nodes.

6. The method according to claim 5, wherein taking the sentence in the source language as the input of the encoding module, taking the sentence in the source language and the preset graph network as the inputs of the graph network module, obtaining the inputs of the decoding module based on the output of the encoding module and the output of the graph network module, taking the translated sentence in the target language corresponding to the input sentence in the source language as the expected output of the decoding module, and obtaining the translation model comprising the trained encoding module, the trained decoding module and the trained graph network module by using the machine learning method, comprises:

taking the sentence in the source language and the preset graph network as the inputs of the graph network module, taking a target translated word in the translated sentence in the target language corresponding to the input sentence in the source language as an expected output of the graph network module, and obtaining the trained graph network module according to a first loss function by using the machine learning method, wherein the target translated word is a translated word in the target language corresponding to the polysemous word in the sentence in the source language;

taking the sentence in the source language as the input of the encoding module, obtaining the inputs of the decoding module based on the output of the encoding module and the output of the graph network module, taking the translated sentence in the target language corresponding to the input sentence in the source language as the expected output of the decoding module, and obtaining the trained encoding module and the trained decoding module according to a second loss function by using the machine learning method; and obtaining the translation model based on the trained encoding module, the trained decoding module and the trained graph network module.

7. The method according to claim 5, wherein adjusting the basic graph network to obtain the preset graph network based on another word other than the polysemous word in the sentence in the source language in the target corpus pair comprises:

determining, for each word in other words other than the polysemous word in the sentence in the source language in the target corpus pair, an appearing probability that each word appears in the target corpus pair when the polysemous word and the translated word corresponding to the polysemous word appear in the target corpus pair at the same time based on the preset corpus set; and adding a word whose appearing probability is greater than a preset probability threshold to the basic graph network, and establishing a relationship between the added word and the polysemous word and a relationship between the added word and the translated word corresponding to the polysemous word, to obtain the preset graph network.

8. A translation apparatus, comprising:
at least one processor; and
a memory storing instructions which, when executed by the at least one processor, cause the at least one processor to perform operations, the operations comprising:

determining, by a trained encoding module, an encoded feature of a sentence to be translated;

determining, by a trained graph network module, a knowledge fusion feature of the sentence to be translated based on a preset graph network, wherein the preset graph network is constructed based on a polysemous word in a source language and a plurality of translated words in a target language corresponding to the polysemous word, wherein the sentence to be translated is in the source language and the plurality of translated words are in the target language, and wherein the target language and the source language are different languages; and determining, by a decoding network, a translated sentence corresponding to the sentence to be translated based on the encoded feature and the knowledge fusion feature, wherein before determining, by the graph network module, the knowledge fusion feature of the sentence to be translated based on the preset graph network, the operations further comprise:

constructing a basic graph network based on the polysemous word in the source language and the plurality of translated words in the target language corresponding to the polysemous word;

determining, in a preset corpus set, a target corpus pair comprising both the polysemous word in the basic graph network and a translated word in the target language corresponding to the polysemous word, wherein each corpus pair in the preset corpus set comprises a sentence in the source language and a sentence in the target language that correspond to each other; and adjusting the basic graph network to obtain the preset graph network based on another word other than the polysemous word in the sentence in the source language in the target corpus pair, wherein the preset graph network includes a node for the polysemous word in the source language, a node for the translated word in the target language comprised in the target corpus pair, a node for the another word in the source language, and correlations between any two of the nodes.

9. The apparatus according to claim 8, wherein determining, by the decoding network, the translated sentence corresponding to the sentence to be translated based on the encoded feature and the knowledge fusion feature comprises:

fusing the encoded feature and the knowledge fusion feature to obtain a fused feature; and determining, by the decoding network, the translated sentence corresponding to the sentence to be translated based on the fused feature.

10. The apparatus according to claim 8, wherein determining, by the graph network module, the knowledge fusion feature of the sentence to be translated based on the preset graph network comprises:

determining, by network layers in the graph network module, correlations between the polysemous word in the sentence to be translated and a plurality of translated words corresponding to the polysemous word in the sentence to be translated based on the preset graph network, and obtaining the knowledge fusion feature.

11. The apparatus according to claim 8, wherein adjusting the basic graph network to obtain the preset graph network based on another word other than the polysemous word in the sentence in the source language in the target corpus pair comprises:

determining, for each word in other words other than the polysemous word in the sentence in the source language in the target corpus pair, an appearing probability that each word appears in the target corpus pair when the polysemous word and the translated word corresponding to the polysemous word appear in the target corpus pair at the same time based on the preset corpus set; and adding a word whose appearing probability is greater than a preset probability threshold to the basic graph network, and establishing a relationship between the added word and the polysemous word and a relationship between the added word and the translated word corresponding to the polysemous word, to obtain the preset graph network.

12. The apparatus according to claim 8, wherein the operations further comprise training a translation model, including:
   obtaining a training sample set, wherein a training sample in the training sample set comprises a sample sentence in the source language and a sample translated sentence in the target language that correspond to each other; and
   taking the sample sentence in the source language as an input of an encoding module, taking the sample sentence in the source language and the preset graph network as inputs of a graph network module, obtaining inputs of a decoding module based on an output of the encoding module and an output of the graph network module, taking the sample translated sentence in the target language corresponding to an input sentence in the source language as an expected output of the decoding module, and obtaining the translation model comprising the trained encoding module, a trained decoding module, and the trained graph network module by using a machine learning method.

13. The apparatus according to claim 12, wherein training the translation model further comprises:
   taking the sample sentence in the source language and the preset graph network as the inputs of the graph network module, taking a target translated word in the sample translated sentence in the target language corresponding to the input sentence in the source language as an expected output of the graph network module, and obtain the trained graph network module according to a first loss function by using the machine learning method, wherein the target translated word is a translated word in the target language corresponding to the polysemous word in the sentence in the source language; and
   taking the sample sentence in the source language as the input of the encoding module, obtaining the inputs of the decoding module based on the output of the encoding module and the output of the graph network module, taking the sample translated sentence in the target language corresponding to the input sentence in the source language as the expected output of the decoding module, and obtaining the trained encoding module and the trained decoding module according to a second loss function by using the machine learning method; and
   obtaining the translation model based on the trained encoding module, the trained decoding module and the trained graph network module.

14. A non-transitory computer readable storage medium storing computer instructions which, when executed by a computer, cause the computer to perform the method of claim 1.

* * * * *